May 14, 1963  B. J. PILLINER  3,089,372
APPARATUS FOR CUTTING MOVING MATERIAL TRANSVERSELY
Filed May 24, 1960

INVENTOR
BERNARD JOSEPH PILLINER
By Hane and Nydick
ATTORNEYS

United States Patent Office 3,089,372
Patented May 14, 1963

3,089,372
APPARATUS FOR CUTTING MOVING MATERIAL TRANSVERSELY
Bernard Joseph Pilliner, Kingsway, Chandler's Ford, England, assignor to National Automation Limited, Chandler's Ford, England
Filed May 24, 1960, Ser. No. 31,458
3 Claims. (Cl. 83—318)

This invention relates to apparatus for cutting moving material transversely of its direction of movement and is particularly concerned with apparatus for cutting into lengths a continuously moving strip or band of material (for example, dough) supported on a conveyor belt or other carrier.

According to the invention there is provided apparatus for cutting moving material transversely of its direction of movement, comprising a cutter member, means for rotating the cutter member about a longitudinal axis so that said member passes transversely through the material once during each rotation and means for moving the cutter member longitudinally in the same direction as the material during passage of said member through the material; the speed of rotation of the cutter member, the speed of longitudinal movement of said member, and the speed of the material being so related that the material is cut along a predetermined line.

Figure 1:
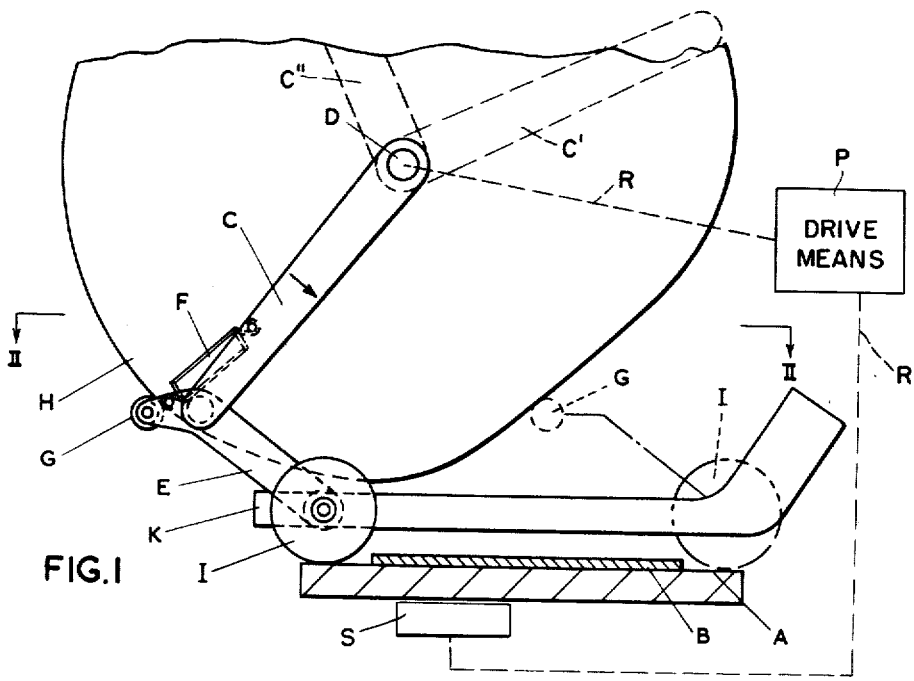
Figure 2:
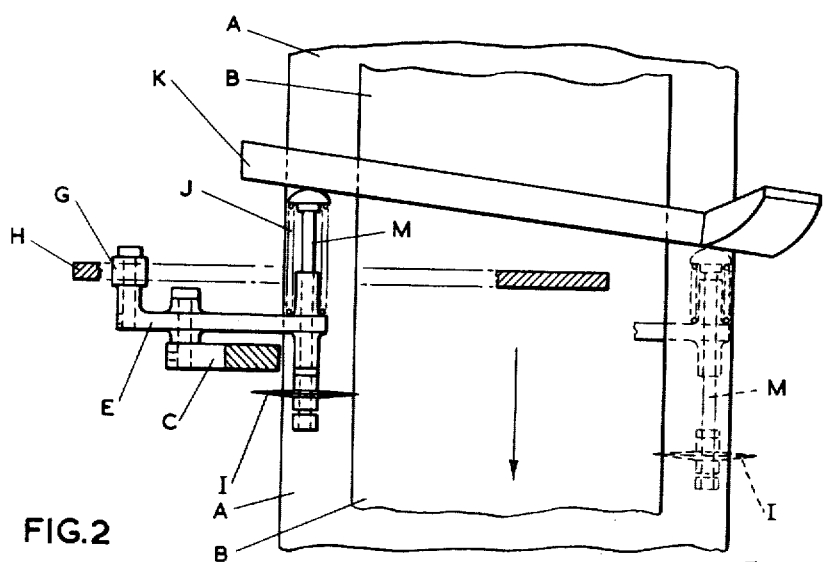

A particular form of apparatus in accordance with the invention is shown by way of example only in the accompanying drawings, in which:

FIGURE 1 is an elevation of the cutting apparatus, a strip of material to be cut and a conveyor belt on which it is supported being shown in cross section, and FIGURE 2 is a plan section taken on the line 2—2 of FIGURE 1.

In the drawing, A represents a continuously moving conveyor belt resting on a stationary support and carrying a strip or band B of material, which is to be cut transversely into lengths. An arm C is mounted for rotation with a longitudinal shaft D and is rotated (anticlockwise in FIGURE 1), at a speed in fixed relation to that of the belt. A drive means P and linkage means for driving belt A by means of a roller S and for rotating shaft D are diagrammatically shown in FIG. 1. Such drive and linkage means are well known in the art and should be visualized as being conventional. (Throughout this specification, and the accompanying claims the term "longitudinal" means parallel to the direction of movement of the material.) Pivotally mounted on the outer end of arm C is a lever E, and a tension spring F (omitted from FIGURE 2) tends to pull lever E into alignment with arm C. One end of lever E carries a roller G, which can co-operate with a stationary cam H to oppose the pull of spring F. The other end of lever E supports a longitudinally slidable shaft M which carries a rotatable circular knife I and is urged rearwardly by a compression spring J. A stationary cam K is positioned to engage the rear end of this knife shaft.

The drawing shows in full lines the position of the parts immediately before the start of a cut. Spring F then holds the knife I against belt A, there being clearance between roller G and cam H, and these relationships are maintained while rotation of arm C carries the knife across the full width of the material B into the position shown in chain lines in the drawing. On the completion of the cut, roller G engages cam H, which returns lever E to its initial position relative to arm C and (the upper part of cam H being concentric with shaft D) so holds it until the parts return to the position shown in full lines. During the making of the cut, the rear end of the knife shaft M is engaged with cam K, which is so shaped that the knife is moved in the direction of the belt travel at a speed equal to that of the belt. After completion of the cut, cam K allows the knife shaft to be returned rearwardly by spring J.

The distances through which the belt moves between successive cuts (i.e. the lengths into which the material is cut) can be varied within wide limits by altering the speed ratio between the belt and the rotating arm and the profile of cam K. If exact straightness of cut is not required, the same cam may be employed, only its angular setting being altered. More than one knife may be operated by the same cams. Thus, a number of spaced arms C each carrying parts E, F, G, I, J as aforedescribed, may be mounted for rotation with shaft D so that the knife or cutter of each arm is carried in turn across the conveyor A in the manner described. The provision of two additional arms C' and C'' is indicated in broken lines in FIG. 1 but will not be further described as these additional arms are identical with arm C and carry similar parts.

I claim:

1. An apparatus for cutting sheet material along a rectilinear line transversely of its direction of movement; said apparatus comprising a support surface for supporting the material to be cut, a cutter, a means for rotating the cutter about an axis parallel to said line of movement of the material so that said cutter passes transversely through the material once during each revolution, said rotating means including an arm mounted at one end for rotation about said axis, a lever pivoted to the other end of said arm, and a shaft supporting said cutter and slidably mounted on said lever for longitudinal movement in reference thereto; and means for additionally moving the cutter transversely of its axis of rotation and in the same direction as the material during passage of the cutter through the material, said means for additionally moving the cutter including a first stationary cam coacting with said lever to vary the pivotal position thereof in reference to said arm during rotation of the arm so as to vary correspondingly the distance of the cutter from said axis, and a second stationary cam extending across the material transversely of the direction of movement thereof, said second cam engaging one end of said shaft to effect longitudinal movement of the shaft during passage of the cutter through the material; the rate of rotation of the cutter, the rate of the transverse additional movement of the cutter, and the rate of movement of the material being so correlated that the material is cut along a line generally transverse of the direction of movement of the material.

2. A cutting apparatus for use in connection with a moving conveyor belt to cut a strip of material lying on said belt along a predetermined transverse line, said apparatus comprising a cutter, means for rotating said cutter about a fixed axis extending above and parallel to the direction of travel of said belt, said means for rotating said cutter including a driven shaft, an arm secured at one end to said shaft, and a lever pivotally secured to the other end of said arm and supporting the cutter, means for positioning said cutter during each revolution thereof so that the cutter moves across the belt in continuous contact with the surface of the belt, said means for positioning the cutter including a cam about the peripheral cam surface of which the cutter rotates, and a spring maintaining the end of the lever remote from the cutter normally in contact with said cam surface, said lever being forced out of contact with said cam surface when the cutter is in contact with the conveyor belt, and means for bodily moving the cutter in the direction of belt travel while the cutter is in contact with the belt surface, the speed of rotation of the cutter and the speed with which the cutter is moved in the direction of belt travel being correlated with the speed of the conveyor belt so that the cutter moves across said belt along said predetermined transverse line.

3. A cutting apparatus for use in connection with a moving conveyor belt to cut a strip of material lying on said belt along a predetermined transverse line, said apparatus comprising a cutter, means for rotating said cutter about a fixed axis extending above and parallel to the direction of travel of said belt, said means for rotating said cutter including a driven shaft, an arm secured at one end to said shaft, and a lever pivotally attached at the other end of said arm and carrying the cutter, means for positioning said cutter during each revolution thereof so that it moves across the belt in continuous contact with the surface of the belt, and means for bodily moving the cutter in the direction of belt travel while the cutter is in contact with the belt surface, said means for bodily moving the cutter in the direction of belt travel including a cam bar extending across and above the conveyor belt, and a shaft slidably mounted on said pivotal lever for movement in the direction of belt travel, said cutter being supported on said shaft and said cam bar being located that its cam surface engages one end of said shaft and effects sliding movement of the latter while the cutter is in contact with the belt, the speed of the cutter rotation and the speed at which the cutter is moved in the direction of belt travel in reference to the speed of the conveyor belt being such that the cutter moves across said belt along said predetermined transverse line.

References Cited in the file of this patent
UNITED STATES PATENTS

| | | |
|---|---|---|
| 1,266,784 | Fegley | May 21, 1918 |
| 1,924,162 | Mason | Aug. 29, 1933 |
| 2,098,413 | Daneke | Nov. 9, 1937 |
| 2,144,201 | Ruau | Jan. 17, 1939 |
| 2,674,310 | Thornley | Apr. 6, 1954 |

FOREIGN PATENTS

| | | |
|---|---|---|
| 43,023 | Denmark | Sept. 22, 1930 |
| 43,230 | Denmark | Oct. 20, 1930 |
| 123,109 | Sweden | Oct. 26, 1948 |

UNITED STATES PATENT OFFICE
CERTIFICATE OF CORRECTION

Patent No. 3,089,372  May 14, 1963

Bernard Joseph Pilliner

It is hereby certified that error appears in the above numbered patent requiring correction and that the said Letters Patent should read as corrected below.

In the grant, lines 2 and 12, and in the heading to the printed specification, line 5, name of assignee, for "National Automation Limited", each occurrence, read -- Rational Automation Limited --.

Signed and sealed this 24th day of December 1963.

(SEAL)
Attest:

ERNEST W. SWIDER
Attesting Officer

EDWIN L. REYNOLDS

Acting Commissioner of Patents